United States Patent [19]

Kronbauer

[11] Patent Number: 5,235,362
[45] Date of Patent: Aug. 10, 1993

[54] SLIDE PROJECTOR FOR WALL PROJECTION AND GROUNDGLASS PLATE PROJECTION

[75] Inventor: Hermann Kronbauer, Aschheim, Fed. Rep. of Germany

[73] Assignee: reflecta GmbH, Schwabach, Fed. Rep. of Germany

[21] Appl. No.: 909,226

[22] Filed: Jul. 2, 1992

[30] Foreign Application Priority Data

Jul. 15, 1991 [EP] European Pat. Off. ............ 111739.8

[51] Int. Cl.⁵ .............................................. G03B 21/30
[52] U.S. Cl. ........................................ 353/71; 353/78; 353/74; 353/119
[58] Field of Search ...................... 353/71, 78, 77, 74, 353/119, 72, 73

[56] References Cited

U.S. PATENT DOCUMENTS 4,572,632  2/1986  Bodier et al. ...................... 353/71
4,640,597  2/1987  Okaro et al. ...................... 353/119
4,810,086  3/1989  Tachibara et al. .................. 353/72
5,004,336  4/1991  Saijo et al. ...................... 353/77

Primary Examiner—William A. Cuchlinski, Jr.
Assistant Examiner—William C. Dowling
Attorney, Agent, or Firm—Bachman & LaPointe

[57] ABSTRACT

A slide projector which is suitable for both wall projection and ground-glass plate projection has a displacement means carrying a deflection mirror system and a ground-glass plate. The displacement means is movable between a collapsed condition in which the displacement means with mirror system and ground-glass plate is in a compact configuration in a housing compartment beneath the projector, for wall projection purposes, and a deployed condition for ground-glass plate projection purposes, in which the displacement means is moved out of the housing compartment into a position in which the mirror system and the ground-glass plate are in front of the lens system of the projector.

7 Claims, 2 Drawing Sheets

SLIDE PROJECTOR FOR WALL PROJECTION AND GROUNDGLASS PLATE PROJECTION

BACKGROUND OF THE INVENTION

The invention relates generally to a slide projector for wall projection and for ground-glass plate projection.

A typical form of slide projector for projection on to a wall or like surface, referred to herein as a wall, and for projection on to a ground-glass plate, comprises a deflection mirror system and a ground-glass plate, which can be disposed in a position in front of the lens system of the slide projector in the ground-glass plate projection mode. The deflection mirror system and the ground-glass plate are suitably disposed in a cover portion of the housing of the projector so that they can be disposed in a collapsed condition to save space in the cover portion of the housing, or can be suitably extended into a position in front of the slide projector lens system in the ground-glass plate projection mode. For wall projection purposes, the cover portion of the housing is pivoted open or completely removed from the projector, and that operation involves a not inconsiderable amount of manipulation, with its attendant advantages.

Slide projectors are also known which are only suitable at all for ground-glass plate projection when the cover portion of the housing, which carries the deflection mirror system and the ground-glass plate itself, are not removable from the projector.

SUMMARY OF THE INVENTION

An object of the present invention is to provide a slide projector which is suitable both for wall projection and ground-glass plate projection, which is easily convertible between the two projection modes.

Another object of the present invention is to provide a slide projector for wall projection and for ground-glass plate projection, which ensures satisfactory projection results in both modes while being of a simple structural configuration such as to ensure that the amount of operator intervention for wall projection or for ground-glass plate projection is slight.

Still another object of the present invention is to provide a slide projector for wall projection and for ground-glass plate projection which is of a compact structure and convenient and easy to use while ensuring stability in operation.

In accordance with the principles of the present invention the foregoing and other objects are achieved by a slide projector for wall projection and for ground-glass plate projection, comprising a deflection mirror system and a ground-glass plate. The mirror system and the ground-glass plate can be suitably disposed in front of the lens system of the projector for ground-glass plate projection purposes. The mirror system and the ground-glass plate are disposed on a displacement means which for wall projection purposes can be disposed in a compact collapsed condition in a compartment of the housing beneath the slide projector while in the ground-glass plate projection mode the displacement means is movable out of the compartment of the housing.

As will be appreciated from consideration of the preferred embodiment hereinafter, a slide projector in accordance with the invention is readily displaceable as desired between the wall projection position and the ground-glass plate projection position. The slide projector according to the invention further gives the advantage that the housing compartment which is beneath the projector imparts good stability to the projector to ensure that it stands firm on the surface on which it is placed for the projection operation.

In accordance with a preferred feature of the invention, the displacement means comprises a telescopically extensible and retractible base means which is adapted to be moved linearly into and out of the housing compartment and which is adapted to pivot about a first pivot axis between a lowered position and a raised position in which it is moved upwardly in front of the lens system. The base means has a first mirror associated with the lens system and a third mirror, while a mirror holding means for a second mirror and a holding means for the ground-glass plate are pivotally connected by means of connecting members to the base means in such a way that, in the ground-glass plate projection position, an upright image is directed by a corresponding projection light beam in respective divergent relationship from the lens system to the first mirror, from the first mirror to the second mirror, from the second mirror to the third mirror and from the third mirror, as a correspondingly enlarged upright image, to the ground-glass plate. A displacement means of that configuration can be designed to be of low weight while at the same time affording good mechanical stability. In addition the amount of force required for displacement of the displacement means between the wall projection position or rest position and the ground-glass plate projection position is slight.

In an advantageous feature of the invention, the telescopic base means may be provided on both sides of the slide projector with a respective base portion and an extension portion which is telescopically displaceable relative to the base portion. The base portion is linearly movably guided in the housing compartment and is pivotably upwardly into a position in front of the lens system about a pivot axis. In such a projector design configuration, the first mirror can be suitably movably mounted on the base portion and the third mirror can be fixed to the extension portion.

Preferably, the mirror holding means on which the second mirror is carried may be pivotally connected on both sides of the projector to the associated extension portion by means of first and second respective connecting members of unequal lengths, wherein the respective longer connecting member is connected with its first end portion to the first end portion, which is guided at all times on the base portion, of the extension portion, and the shorter connecting member is pivotally connected by its first end portion to the second end portion, which is telescopically movable into and out of the base portion, of the extension portion. The second end portions of the shorter and the longer connecting members are pivotally connected at spacings from each other to the mirror holding means for the second mirror.

The holding means for the ground-glass plate may preferably be pivotally connected to the mirror holding means for the second mirror and the second end portion of each of the two lateral longer connecting members.

Preferably, the ground-glass plate with its associated holding means, the mirror holding means for the second mirror and the connecting members are adapted to be pivoted together into the space defined between the two lateral extension portions of the telescopically displaceable base means. That configuration provides a compact projector which is convenient to handle.

The displacement means may be displaceable by means of a drive motor between the collapsed rest or wall projection position and the extended ground-glass plate projection position, thus providing a projector which is convenient to operate. In a simpler and less expensive alternative configuration of the slide projector according to the invention the displacement means may be displaceable between the rest or wall projection position and the ground-glass plate projection position manually. Irrespective of whether the displacement means is actuated manually or by a motor drive, the individual components co-operate in such a way that, in the ground-glass plate projection position, the mirrors and the ground-glass plate are suitably accurately associated with each other for an upright image to be formed on a suitably enlarged scale in an upright position on the ground-glass plate.

Further objects, features and advantages of the present invention will be apparent from the following description of a preferred embodiment.

DESCRIPTION OF THE PREFERRED EMBODIMENT

Figure 1:
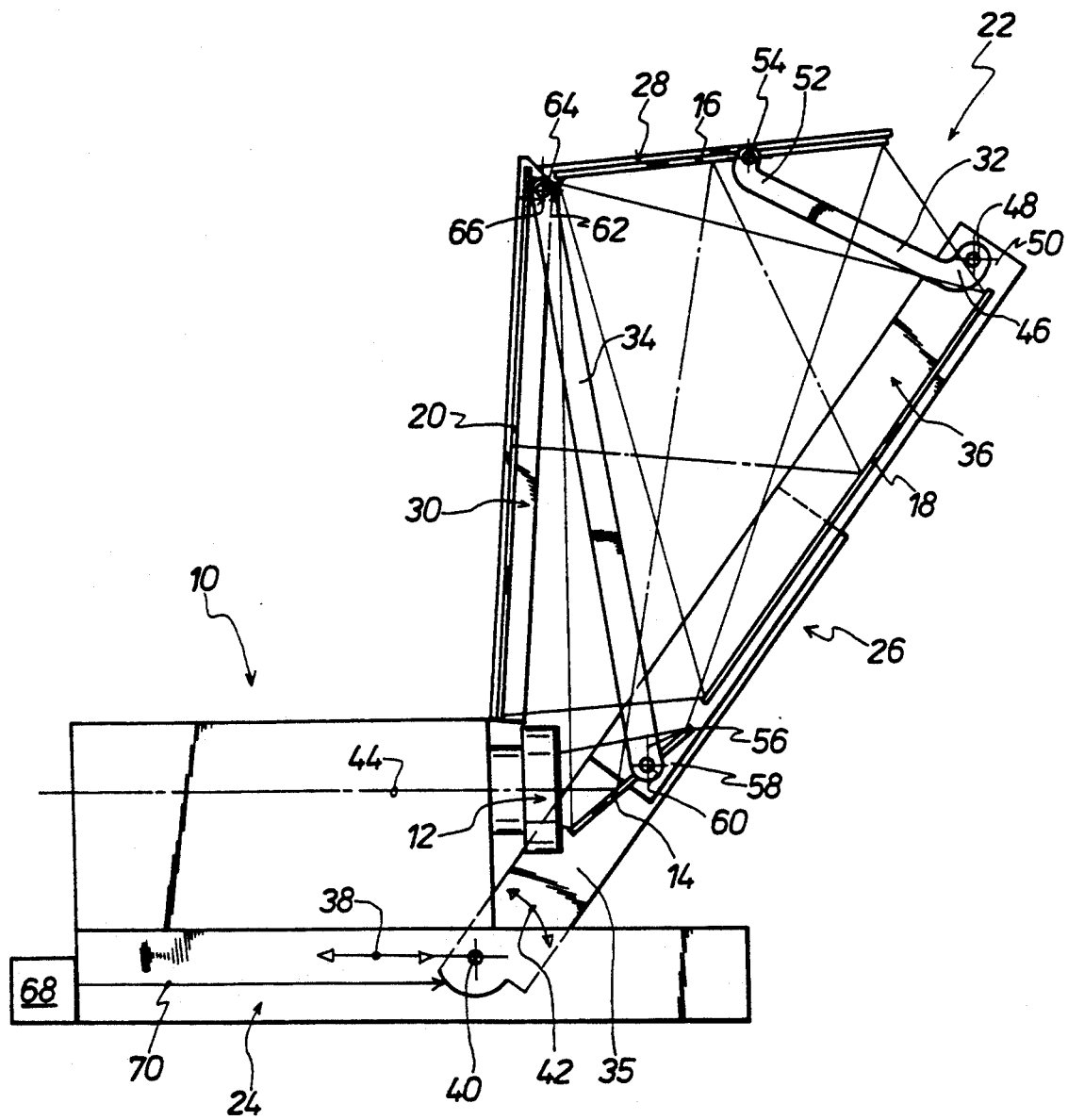
FIG. 1 is a side view of the slide projector according to the invention in the ground-glass plate projection position.

Referring firstly to FIG. 1, shown therein is a side view of an embodiment of a slide projector according to the invention, indicated generally at 10, which is convertible between a wall projection position or mode and a ground-glass plate projection position or mode. As indicated, the slide projector 10 is shown in the ground-glass projection position in FIG. 1.

Figure 2:
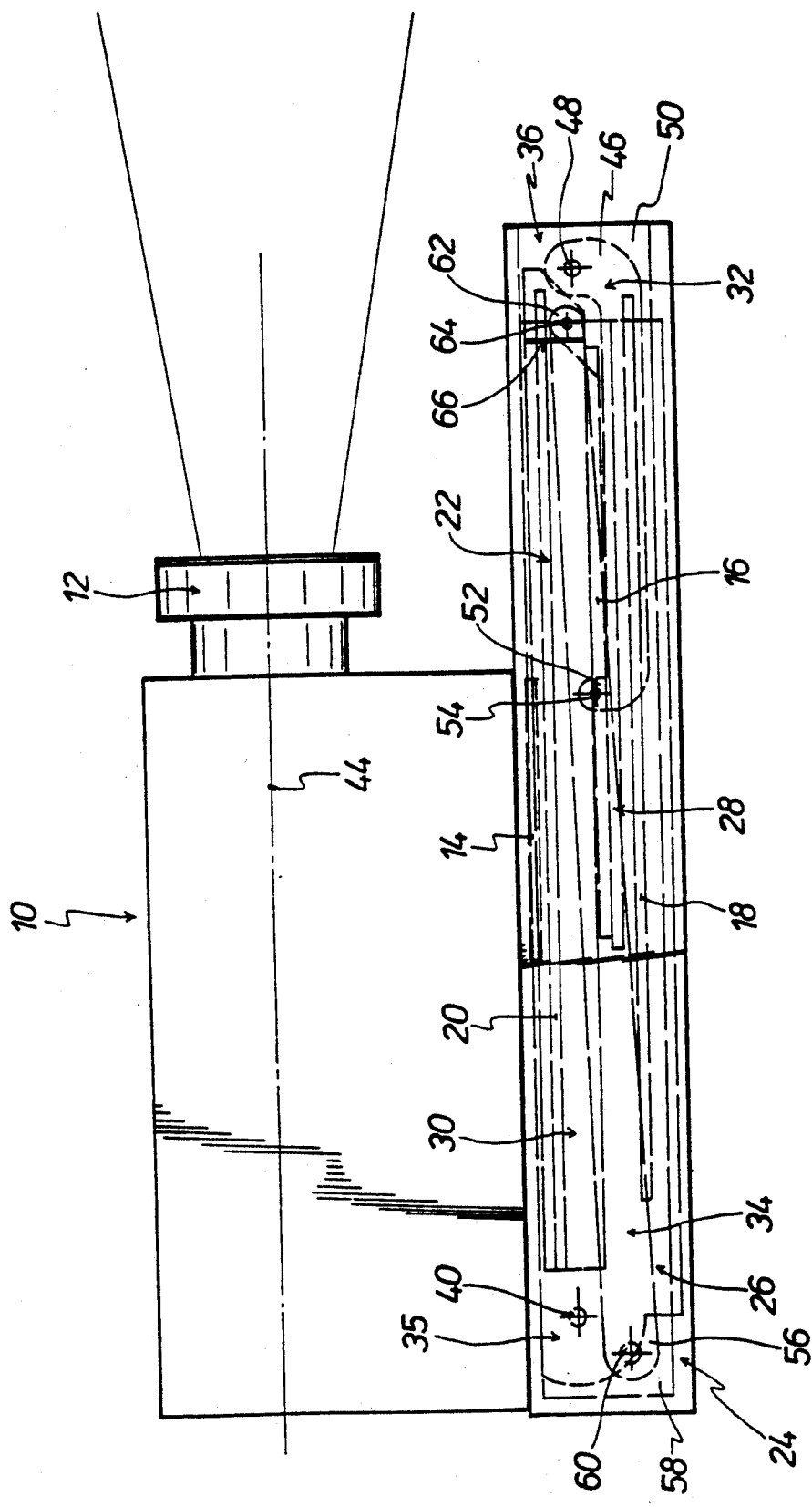
FIG. 2 is a side view of the slide projector shown in FIG. 1, but in the wall projection position.

The slide projector 10 comprises a lens system which is diagrammatically indicated at 12, and a deflection mirror system which can be moved into a position in front of the lens system 12, the mirror system comprising a first mirror 14, a second mirror 16 and a third mirror 18. Reference numeral 20 identifies a ground-glass plate on to which an image is projected by the slide projector. The mirror system consisting of the mirrors 14, 16 and 18, and the ground-glass plate 20, are carried on a displacement means which is generally indicated at 22 and which is displaceable between a deployed position as shown in FIG. 1, for projection of the slide image on to the ground-glass plate 20, and an inoperative position as shown in FIG. 2 in which the displacement means 22 with deflection mirror system and ground-glass plate 20 can be collapsed in a compact arrangement in a housing compartment 24 which is disposed beneath the slide projector 10. When the displacement means 22 with the deflection mirror system 14, 16, 18 and the ground-glass plate 20 are in the position shown in FIG. 2, the slide projector 10 is in the appropriate condition for projection on to a wall or like surface.

The displacement means 22 comprises a base means indicated at 26 for carrying the first mirror 14 and the third mirror 18, a mirror holder 28 for carrying the second mirror 16 and a holder 30 for carrying the ground-glass plate 20, as well as lateral connecting members 32 and 34 with which the mirror holder 28 for the second mirror 16 and the holder 30 for the ground-glass plate 20 are suitably pivotally connected to the base means 26. On each side of the slide projector 10, the base means 26 has a respective base portion 35 and an extension portion 36 which is telescopically displaceable relative to the base portion 35. The base portion 35 is linearly movably guided in the housing compartment 24, as indicated by the arrow 38 in FIG. 1. The base portion 35 is also pivotable about a first pivot axis as indicated at 40 so that it is displaceable pivotally between a lowered position as shown in FIG. 2 and a raised position as shown in FIG. 1 in which it has been pivoted upwardly into a position in front of the lens system 12 of the slide projector 10. The pivotal movement of the base portion 35 about the pivot axis 40 is indicated by the double-headed arrow 42 in FIG. 1.

The first mirror 14 is suitably movably mounted to the base portion 35 of the base means 26 so that, in the ground-glass plate projection position shown in FIG. 1, the first mirror 14 is positioned in front of the lens system 12 inclinedly at a suitable angle relative to the optical axis 44 of the lens system 12 of the projector. The third mirror 18 is fixed to the extension portion 36 of the telescopically displaceable base means 26.

It will be seen from FIG. 1 that the lateral connecting members 32 and 34 at each respective side of the slide projector 10 are of unequal lengths. Each of the two lateral shorter connecting members 32 is pivotally connected by its first end portion as indicated at 46 by means of a second pivot axis 48 to a second end portion 50 of the extension portion 36 of the base means 26. At its second end portion 52, each shorter connecting member 32 is pivotally connected by means of a third pivot axis 54 to the mirror holding means 28 for the second mirror 16.

Each of the two lateral longer connecting members 34 is pivotally connected by its first end portion as indicated at 56 to the first end portion 58 of the extension portion 36 of the base means 26, by means of a fourth pivot axis as indicated at 60. The second end portion 62 of each lateral longer connecting member 34 is pivotally connected by means of a fifth pivot axis 64 both to the mirror holding means 28 for the second mirror 16 and also to the holding means 30 for the ground-glass plate 20. The holding means 30 for the ground-glass plate 20 also has an abutment as indicated at 66 in order to cause it to adopt a suitable position in the deployed ground-glass plate projection position.

It will be appreciated that the individual components of the displacement means 22 are so dimensioned and the individual pivot axes of the displacement means 22 are so disposed that it is readily possible for the displacement means 22 to be moved between the ground-glass plate projection position shown in FIG. 1 and the wall projection position shown in FIG. 2, which is also the rest position of the assembly. The displacement means 22 can be displaced between the FIG. 1 position and the FIG. 2 position manually or by means of a drive motor which is diagrammatically indicated by block 68 in FIG. 1. The motorised version of the slide projector 10 is more convenient to use. In that construction the drive motor 68 acts for example on the base portion 35 of the base means 26, the drive connection between the drive motor 68 and the base portion being diagrammatically indicated by the arrow 70 in FIG. 1.

It will be seen that, when the displacement means 22 is moved from the rest position of the projector, which is also the screen projection position, as shown in FIG. 2, into the deployed position for the ground-glass plate projection mode, the telescopic base means 26 is moved linearly out of the housing compartment 24 and pivoted upwardly into its position in front of the lens system 12 about the pivot axis 40. In that position an upright image of a slide is passed by a suitable projection light beam in respective divergent relationship from the lens system 12 on to the first mirror 14, from there to the second mirror 16, from the second mirror 16 to the third mirror 18 and from the third mirror 18, as a correspondingly enlarged upright image, to the ground-glass plate 20.

It will be appreciated that the above-described construction has been set forth solely by way of example and illustration of the principles of the present invention and that various modifications and alterations may be made therein without thereby departing from the spirit and scope of the present invention.

What is claimed is:

1. A slide projector for wall projection and for ground-glass plate projection, comprising a slide projector unit having a lens system, a housing compartment beneath the slide projector unit, a deflection mirror system, a ground-glass plate, and a displacement means carrying the mirror system and the ground-glass plate and displaceable between a collapsed condition in which it is disposed in the housing compartment for the wall projection mode of the slide projector unit and a deployed condition for the ground-glass plate projection mode in which the mirror system and the ground-glass plate are operatively disposed in front of the lens system of the slide projector unit, wherein the mirror system comprises first, second and third mirrors, wherein the displacement means comprises a base means which is telescopically linearly movable into and out of the housing compartment and which is pivotable about a first axis between a lowered position and a raised position in front of the lens system and which carries a first mirror associated with the lens system and a third mirror, and wherein the displacement means further includes a first mirror holding means for the second mirror, a second holding means for the ground-glass plate, and connecting members pivotally connecting the first and second holding means to the base means in such a way that in the ground-glass plate projection position an upright image is deflected by a corresponding projection light beam in respectively divergent relationship from the lens system to the first mirror, from there to the second mirror, from the second mirror to the third mirror and from same, as a correspondingly enlarged upright image, to the ground-glass plate.

2. A projector as set forth in claim 1 wherein the base means has on each side of the slide projector unit a respective base portion which is pivotable about said first axis between the lowered position and the raised position of the base means and an extension portion which is telescopically displaceable relative to the base portion and further including means for linearly movable guiding the base portion in the housing compartment.

3. A projector as set forth in claim 2 wherein the first mirror is movably mounted on the base portion and the third mirror is fixed to the extension portion.

4. A projector as set forth in claim 2 wherein the first mirror holding means carrying the second mirror is pivotally connected on each side of the slide projector unit to the associated extension portion by means of first and second respective connecting members of unequal lengths, wherein the longer connecting member has a first end portion connected to the extension portion at a first end portion thereof which is guided at any time on the base portion, and the shorter connecting member has a first end portion pivotally connected to the extension portion at the second end portion thereof which is telescopically extensible out of the base portion, and the second end portions of the shorter and longer connecting members are pivotally connected at spacings from each other to the first mirror holding means for the second mirror.

5. A projector as set forth in claim 4 including means for pivotally connecting the second holding means for the ground-glasss plate to the first mirror holding means for the second mirror and the second end portion of each of the two lateral longer connecting members.

6. A slide projector as set forth in claim 2 wherein the ground-glass plate with its associated second holding means, the first holding means for the second mirror and the connecting members are adapted to be pivoted together into the space defined between the two lateral extension portions of the telescopically displaceable base means.

7. A projector as set forth in claim 1 including a drive means for displacing the displacement means between the collapsed condition and the deployed condition.

* * * * *